(12) United States Patent
Leach, Jr. et al.

(10) Patent No.: US 8,502,729 B2
(45) Date of Patent: Aug. 6, 2013

(54) ULTRA-WIDEBAND RADAR SENSORS AND NETWORKS

(75) Inventors: Richard R. Leach, Jr., Castro Valley, CA (US); Faranak Nekoogar, San Ramon, CA (US); Peter C. Haugen, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1247 days.

(21) Appl. No.: 11/699,638

(22) Filed: Jan. 29, 2007

(65) Prior Publication Data

US 2008/0007445 A1 Jan. 10, 2008

Related U.S. Application Data

(60) Provisional application No. 60/763,815, filed on Jan. 30, 2006, provisional application No. 60/763,785, filed on Jan. 30, 2006, provisional application No. 60/763,814, filed on Jan. 30, 2006.

(51) Int. Cl.
*G01S 13/88* (2006.01)
*G01S 13/56* (2006.01)
*G08B 13/181* (2006.01)

(52) U.S. Cl.
USPC .................................. 342/28; 340/552; 342/21

(58) Field of Classification Search
USPC ................ 342/27, 28, 21; 340/506, 517, 531, 340/552
See application file for complete search history.

(56) References Cited

U.S. PATENT DOCUMENTS

| 5,361,070 A | 11/1994 | McEwan |
| 7,119,676 B1 * | 10/2006 | Silverstrim et al. ........... 340/531 |
| 2008/0007404 A1 * | 1/2008 | Albert et al. .................. 340/552 |

FOREIGN PATENT DOCUMENTS

WO  WO 2005/043930 A2  5/2005

* cited by examiner

*Primary Examiner* — Ian Lobo
(74) *Attorney, Agent, or Firm* — John P. Wooldridge

(57) ABSTRACT

Ultra wideband radar motion sensors strategically placed in an area of interest communicate with a wireless ad hoc network to provide remote area surveillance. Swept range impulse radar and a heart and respiration monitor combined with the motion sensor further improves discrimination.

29 Claims, 4 Drawing Sheets

ULTRA-WIDEBAND RADAR SENSORS AND NETWORKS

This application claims priority to U.S. Provisional Patent Application Ser. No. 60/763,815, titled: "Strategic ad hoc low power ultra-wideband (UWB) rear guard sensors (RGS)", filed Jan. 30, 2006, incorporated herein by reference. This application claims priority to U.S. Provisional Patent Application Ser. No. 60/763,785, titled: "Low-Power Network UWB Radar Sensors", filed Jan. 30, 2006, incorporated herein by reference. This application claims priority to U.S. Provisional Patent Application Ser. No. 60/763,814, titled: "Cooperative Detection, Discrimination, and Tracking Ultra-wideband Radar Sensor Network", filed Jan. 30, 2006, incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to ultra-wideband radar technology, and more specifically, it relates to wireless ultra-wideband (UWB) sensors and networks.

2. Description of Related Art

Wireless distributed systems are being developed to reliably monitor a wide range of environments for both military and civilian applications. Detection of motion can be extremely useful for border management, infrastructure protection, and network-centric warfare applications. Currently there are very few perimeter security systems that utilize a network of interconnected, independent sensors. Most perimeter intrusion detection networks require an extensive infrastructure to be setup in advance. Some of the most modern systems utilize lengths of buried cable placed at a set depth around the entire perimeter to be monitored. Others employ a series of cameras or other motion sensors. All of these options require a substantial infrastructure either for the sensors themselves, or for power and data communications. Also, the majority of current systems are not able to determine where along the monitored perimeter the intrusion occurred. In addition the current technology does not permit a reliable method of target discrimination. Some systems estimate the approximate size of the intruder and try to perform simply discrimination using that information.

The ability to identify targets by ultra wideband radar based on emitted impulse and step frequency wave systems has been investigated previously by many independent researchers. These efforts fall mainly into the following signal processing methods:

The Wigner distribution (WD) combines the autocorrelation function and the Fourier transform to represent signals in a combined time and frequency domain. This technique is very useful for classifying signals backscattered from targets. Researchers have surmised that dolphins use WD's in a likewise manner to classify underwater targets. (Gaunaurd, et al., 1996) (Stifors, et al., 2000).

The wavelet transform is a time-frequency technique that is useful for observing nonstationary properties of ultra-wideband radar echoes. The ability to locate large bandwidth events with high temporal resolution and stationary events with good frequency resolution is attractive in identifying the impulse response of signals and systems such as those found in the UWB target response. Wavelet theory allows the time and frequency resolution tradeoff to be equal at all points. Localization and classification of the singularities in the target impulse response was found to be the best approach for detecting and identifying signals (Chambers, et al., 1993). Discontinuities of interest associated with UWB radar arise from the reflections from different surfaces producing impulsive reflections and their derivatives. Detection of these features would provide indication about the target size, orientation, and shape. Advantages: (1) band limited and time limited events can be localized on a resolution grid approaching the optimal limit, (2) following the transition of the wavelet maximal decay across a range of scales allows the characterization of local discontinuities—a significant aid to target measurement, and (3) the analysis using wavelet transformation corresponds closely to the physical processes, providing a more appropriate framework in which to view dispersive propagation than traditional methods. (Jouny, et al., 1992, 1994) (Fargues, et al., 1993)

The extinction-pulse (E-pulse) discrimination scheme, based upon the singularity expansion method, is commonly used in ultra-wideband radar target discrimination. This technique can be used if the scattering target produces a significant natural response in the frequency range of the radar. The electric field scattered by the target can then be divided into an early-time and a late-time response. The beginning of the late-time response is defined as the maximum amount of time required for the last scattered radiation to travel from the target to the receiving antenna. Early-time corresponds to the forced response period when the excitation waveform is traversing the target, producing a response dominated by localized specular reflections from target scattering centers. The late-time response is the free oscillation period that exists after the excitation waveform has passed.

While the early-time response is very complex, the late-time response can be decomposed into a finite sum of damped sinusoids oscillating at natural frequencies determined by the target geometry. An E-pulse is a transient, finite duration waveform designed to cancel out specific natural resonances of the target, which appear in the late-time response. Thus, when convolving with the late-time target response, the E-pulse can be used to discriminate between targets having different natural frequency characteristics. The correct E-pulse is identified from a predefined library of E-pulses by the convolution with the lowest energy.

The late-time E-pulse technique is aspect independent. Since the target resonance frequencies are independent of the excitation waveform, the late-time E-pulse technique will function regardless of the aspect angle of the incident waveform on the target A disadvantage of using the late-time E-pulse technique is that when the target resonant response is available, it often has low signal strength. Researchers have demonstrated this technique to work reasonably well in noisy environments; however, if the SNR is too low, ambiguous results are obtained (Mooney, et al., 2000).

A more complex method using the higher signal strength early-time response may be desirable. The early-time technique cancels the frequency domain sinusoidal functions arising from aspect dependent temporal positions of the specular reflections. The early-time technique can yield more explicit results; however, E-pulses must be defined for the target in each different aspect angle. For optimal target identification, researchers have developed methods that combine the E-pulse time domain analysis for the late-time response, and frequency domain cancellation in the early-time response (Rothwell, et al., 1994).

Several researchers continue to study, develop and improve the E-pulse methods. (Rothwell, et al., 1985, 1986, 1995

Chen, et al., 1986, 1994 Ross, et al., 1990, 1994, 1998, Li, et al., 1998, Damjanschitz, et al., 1999) The aforementioned methods consider only single targets. In the case of multiple targets, one must consider the effects of mutual coupling and natural frequency differences of the system as compared to isolated targets. A drawback of conventional E-pulse analysis is that it requires a priori knowledge about the natural frequencies of the target for late-time analysis, and the locations and transfer functions of target scattering centers as a function of aspect angle for early-time analysis. Developments are being made to enable the extraction of E-pulses directly, without a priori knowledge of their response. In addition, means of eliminating redundancies and reducing computing demands from the combined early-time/late-time method have been recently published.

Techniques using third order statistics can reveal information about non-Gaussian signals and nonlinearities, which cannot be observed using conventional, second order techniques. Higher Order Spectra (HOS) techniques are frequently used in speech processing and have been used with ultra-wideband radar to classify targets by extracting bispectral signatures related to geometric and textural properties of the target (Marmarelis, et al., 1992).

Kernal analysis is an HOS technique that involves treating the target as a black-box system with an unknown impulse response. Experimental data consisting of incident waveforms and return signals for various targets are used to develop models of varying order to describe and classify the impulse response. The backscattered echoes from an unknown target and the incident impulse are then used to determine the impulse response model with the best fit.

One method of obtaining an approximate temporal impulse response of a target is from frequency domain physical optics (FDPO). This technique is accurate only at frequencies where the wavelength is very short compared to the target, and for angles that don't induce traveling waves. Time domain physical optics (TDPO) may be more appropriate for developing response models to large faceted targets because it can more efficiently analyze a large amount of scattering data (Skinner, et al., 1993). The greatest error in these techniques is in modeling targets that are curved in the direction of propagation, due to non-linear progression of the surface's current phase along the body. Skinner also reports that knowledge of the facetization of the target is required for result accuracy.

Previous work (Abrahamasson, et al., 1991) predicts the form-function in the backscattering radar cross-section of spherical dielectric targets using a discrete Fourier transform (DFI) technique. Target identification is performed using target resonances extracted using echoes from scattering structures. Another computational method (Skinner, et al., 1993) called FDPO reports that knowledge of the facetization of the target is required for result accuracy. More recent research (Mooney, et al., 2000) uses energy discrimination number (EDN) statistics for E-pulse target identification. This work developed a theoretical method for determining the probability of identifying a target from a family of M targets.

The above findings add significantly to the body of knowledge for discrimination methods using received energy from target reflections, however, such techniques generally employ higher power that results in significantly stronger reflected energy.

Accordingly, it is desirable to have available a low power, deployable sensor network having the ability to be rapidly deployed with minimal infrastructure required. It is desirable that such a system could actively detect, discriminate, and track targets as they passed through the perimeter. The present invention provides such devices and their methods of operation.

SUMMARY OF THE INVENTION

It is an object of the present invention to provide ad hoc low power ultra-wideband (UWB) radar rear guard sensors and networks of such sensors.

Another object is to provide low-power network UWB radar sensors.

Still another object is to provide cooperative detection, discrimination, and tracking by UWB radar sensor networks.

These and other objects will be apparent based on the disclosure herein.

Embodiments of this invention utilize UWB radar low power sensors deployed in a strategic manner and integrated with wireless ad hoc networks to provide a long-range detection capability in harsh propagation environments such as cluttered urban areas. The sensor network provides constant monitoring for intrusion detection and relays the information to a destination far from the area of strategic interest The sensor nodes employed in one embodiment use UWB radar signal reflections at a fixed range and give an alarm if there is significant differential movement at that range. This sensor network is for short-range applications in inter-node communication, exfiltration communication, geolocation, and motion detection. However, when combined with wireless ad-hoc networks they can achieve very long range monitoring capability. The same sensor networks can be modified to distinguish intrusion caused by animals versus human. Furthermore, the strategic sensor networks presented in this invention are not limited to intrusion detection and minor modification makes them capable of detecting various kinds of chemical and biological agents for constant reporting of sensor data to a destination far from the area of interest The individual nodes contain wireless sensors, GPS electronics (e.g., GPS transmitter and receiver), local communications and processing capability. The nodes network with each other and communicate with a "mother" node serving as the long-range uplink that communicates with a remote monitoring station Detection of motion for strategically important areas is extremely useful for infrastructure protection as well as network-centric warfare applications such as sni per protection in tactical battlefields and silent monitoring of insurgent activities. Also, the ability to detect various chemical and biological agents from a long distance is of significant importance to various government agencies.

The strategic ad hoc low power UWB sensor networks of the present invention can be used to reliably monitor a wide range of environments for civilian applications such as habitat monitoring, environment observation, health monitoring, home automation and smart home/office environments. Detection of motion can be extremely useful for border management, infrastructure protection, and network-centric warfare applications. A need exists for a rapidly deployable, self-configuring, sensor network, which can report sensor data to remote monitors via radio link. Wireless distributed systems are also used to reliably monitor a wide range of environments for civilian applications such as habitat monitoring, environment observation, health monitoring, home automation, smart home/office environments.

The cooperative discrimination sensor described herein can be networked to provide detection, tracking, and discrimination of human activity. A low power network of these sensors detects motion, tracks the motion, and reliably determines if the dominant moving object was or was not a person. The combination of several UWB concepts provides a key to this approach. The first is a low power motion sensor that uses micro impulse radar and is capable of continuous and reliable operation for months at a time with a small battery. The second is a dual radar motion tracking system. The third is a heartbeat and respiration rate (HRR) radar device. The combination of these three devices into one sensor package will result in a sensor that, when implemented in a network configuration, offers a unique solution to address this problem.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

An embodiment of the present invention is a low power UWB wireless sensor network that can be placed in a strategically important area to constantly monitor the data of interest and relay the information to a destination far from the source using wireless ad-hoc networks. This strategic sensor network uses radar sensors, described below, at each node that examine radar signal reflections at a fixed range and give an alarm if there is a significant differential movement at that range. UWB signals used in these sensor nodes have an inherent immunity to multipath phenomenon as well as signal jamming, and are very difficult to detect by unauthorized parties. Therefore, the sensor nodes can provide high performance in harsh propagation environments as well as covertness for constant monitoring and reporting data in areas where the currently available wireless sensor networks based on narrowband signaling schemes fail.

The low power sensors of this invention, at times referred to herein as "guardian sensors", can be placed around a strategically important area as opposed to being randomly scattered in a field. Network operation uses ultra-wideband (UWB) signals by transmitting wideband, ultra-short pulses of radio frequency energy and receiving those pulses remotely. Wireless ad hoc networks (UWB and conventional) are known in the art. Motion sensing is accomplished by continuously measuring the environment and alarming when a change occurs. As discussed below in detail, each sensor node includes an embedded processor board with analog to digital capability and serial (RS232 or USB) data transfer capability as well as ultra-wideband micro-impulse radar (MIR) fixed range transmitter and receiver capability with omni-directional antennas. The sensors are capable of self-calibration on command and are able to adjust sensitivity and detection range (diameter) on command. In addition, these sensors are capable of reporting their health on command, are robust to multi-path (cluttered environments) and resistant to interference. Motion detection sensors employ covert UWB circuits that radiate low RF energy that is difficult to detect with conventional standards and means.

Figure 1:
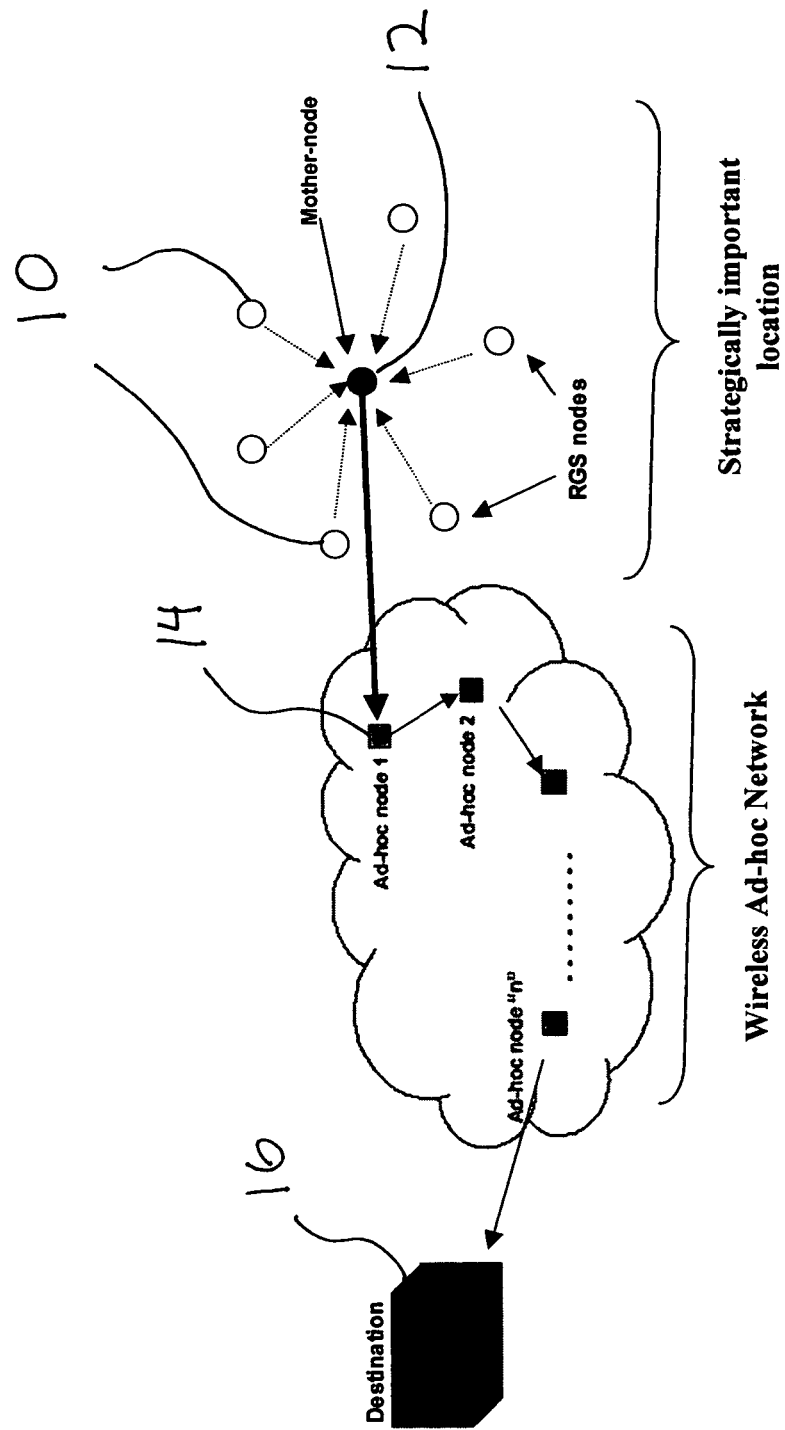
FIG. 1 shows an embodiment of a strategic ad-hoc low power UWB rear guard sensor network.
Figure 2:
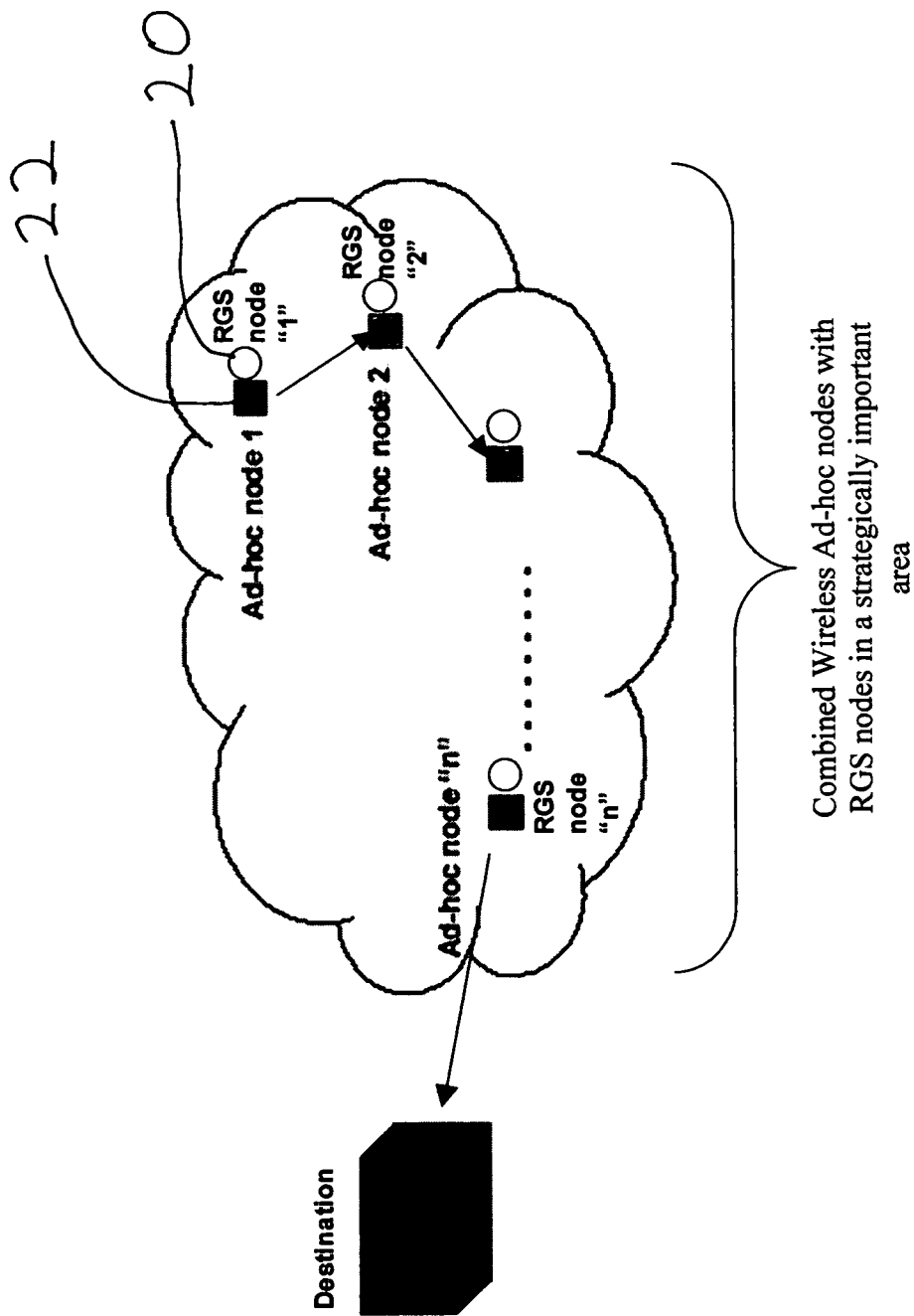
FIG. 2 shows another configuration for a strategic ad-hoc low power UWB rear guard sensor network

FIGS. 1 and 2 describe exemplary architectures that can provide strategic detection with ad-hoc networks. FIG. 1 shows a configuration that spreads the low powered UWB rear guard sensor (RGS) nodes 10 around an area of interest and transfers the collection of sensor data to a mother-node 12. The mother-node then relays the information to one of the nodes, e.g., node 14, of an ad-hoc network, which relays the information to its destination 16, enabling long range monitoring capability. In an embodiment of the present invention, the wireless ad-hoc network nodes relay only the information from the RGS nodes and no processing and decision making is performed in the ad-hoc network nodes. The nodes in the ad-hoc network amplify and forward the information in order to improve the communications range. All the intelligence regarding the strategic area of interest is provided by the RGS network.

FIG. 2 shows another configuration for the present invention that combines the RGS nodes with an ad-hoc network node to directly report the sensed data to the network for immediate relay to the far destination. For example, RGS node 20 is attached to ad-hoc node 22. In this configuration, the RGS nodes combined with the ad-hoc network nodes are able to constantly monitor an event of interest in a strategic area and immediately report detected data to a far destination.

An embodiment of network operation uses ultra-wideband (UWB) signals by transmitting wideband, ultra-short pulses of radio frequency energy and receiving those pulses remotely. Motion sensing is accomplished by continuously measuring the environment and alarming when a change occurs. The micropower impulse radar (MIR) sensor provides unique capabilities due to its well-defined range gates. For example, an MIR electronic trip-wire with its precise range gate could form a protective "fence" around facilities. All motion inside or outside the fence would be ignored. Any human penetration of the fence would provide an alarm. Dual range gate sensors would provide direction of penetration. These sensors will be configured with wireless communications to allow remote replacement and reporting.

Figure 3:
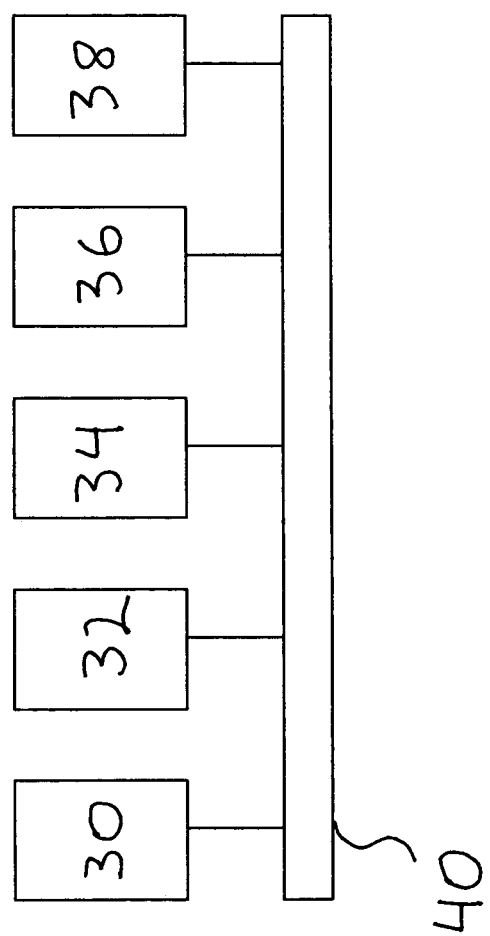
FIG. 3 shows block diagram of an exemplary sensor node.

As shown in the block diagram of FIG. 3, an exemplary embodiment of a present sensor consists of a network of elements (nodes) that have minimally, five components or modules; central processing module (CPU) 30, global positioning module (GPS) 32, transmitter and receiver communications module (COMMS) 34, power and control module 36, and radar detector sensor module (RDS) 38. All five modules are controlled by a common power and control bus 40. The system also has 2 D cell 3.6V batteries, chassis, and three antenna modules. The sensors are designed as a ultra-wideband, ultra-low power system to provide long-life (>1 year) intrusion detection networks. Detection for a 15 meter circle with very little battery drain (3 mW) can be accomplished by radar return signal integration. The circuit design averages received reflection energy to detect motion during a very precise range-gated time window. The system is easily adaptable to any number of modules, sensor types, and packaging designs.

The omnidirectional loop antenna used in this invention allows full 360 degree detection coverage. The RDS is a range gated radar sensor that allows it to be set at any specific range up to a maximum of approximately 20 feet in radius. The range of the sensor is nominally set at a 30 foot diameter detection hemi-sphere or 'bubble' surrounding the sensor. To be precise, the bubble has a dimension in thickness of approximately 2 feet. Objects moving anywhere in this zone will result in a change in radar reflections received by the sensor. These changes will trigger a threshold circuit and produce a detection alarm.

Based on emitting and detecting very low amplitude and short voltage impulses, the system and radar have a very sensitive window, or range gate, for accurately detecting received signals and reflections from boundaries between different materials. The hardware package is very small and has low power requirements. Average emissions from tested MIR radio and radar units are below 10 microwatts and are spread over several gigahertz, virtually eliminating both interference and interception.

Network operation uses ultra-wideband (UWB) signals by transmitting wideband, ultra-short pulses of radio frequency energy and receiving those pulses remotely. UWB communications uses short (<1 ns) pulses rather than a narrowband carrier frequency to transmit information. Much is unknown with this type of carrierless RF communications with respect to capacity, range, penetration, and reliability.

Motion sensing is accomplished by continuously measuring the environment and alarming when a change occurs. The micro-impulse radar (MIR) sensor provides unique capabilities due to its well-defined range gates. For example, an MIR electronic trip-wire with its precise range gate could form a protective "fence" around facilities. All motion inside or outside the fence would be ignored. Any human penetration of the fence would provide an alarm. Dual range gate sensors would provide direction of penetration as additional detection and discrimination information. These sensors will be configured with wireless communications to allow remote replacement and reporting.

To look beyond simple detection, the UWB sensors provide information about the intruder, based on analysis of radar return signal characteristics. Specifically, it would be useful to determine whether an intrusion alert was triggered by a human, multiple humans, or accidentally by wildlife. Target discrimination capability significantly diminishes the false positive alarm rate.

The present ultra-wideband, ultra-low power system provides long-life (>1 year) intrusion detection networks, with very limited capability for capture and analysis of the reflected signal. Detection for a 15 meter circle with very little battery drain (3 mW) is accomplished by radar return signal integration. The circuit design averages received reflection energy to detect motion during a very precise range-gated time window. In the Guardian system, the characteristic singularities and frequency content typically used to identify targets have, to a large extent, been filtered out.

In addition, previous techniques have been demonstrated largely on metallic and stationary targets. Knowledge of the facetization of the target is usually unknown and often rapidly changing as bodies, cars, etc., move through the detection zone. Furthermore, the targets of interest are typically in motion and commonly move with unpredictable speeds and paths.

The RDS is a range gated radar sensor that allows it to be set at any specific range up to a maximum of approximately 20 feet in radius. The range of the sensor is nominally set at a 30 foot diameter detection hemi-sphere or 'bubble' surrounding the sensor. To be precise, the bubble has a dimension in thickness of approximately 2 feet. Objects moving anywhere in this zone will result in a change in radar reflections received by the sensor. These changes will trigger a threshold circuit and produce a detection alarm.

Figure 4:
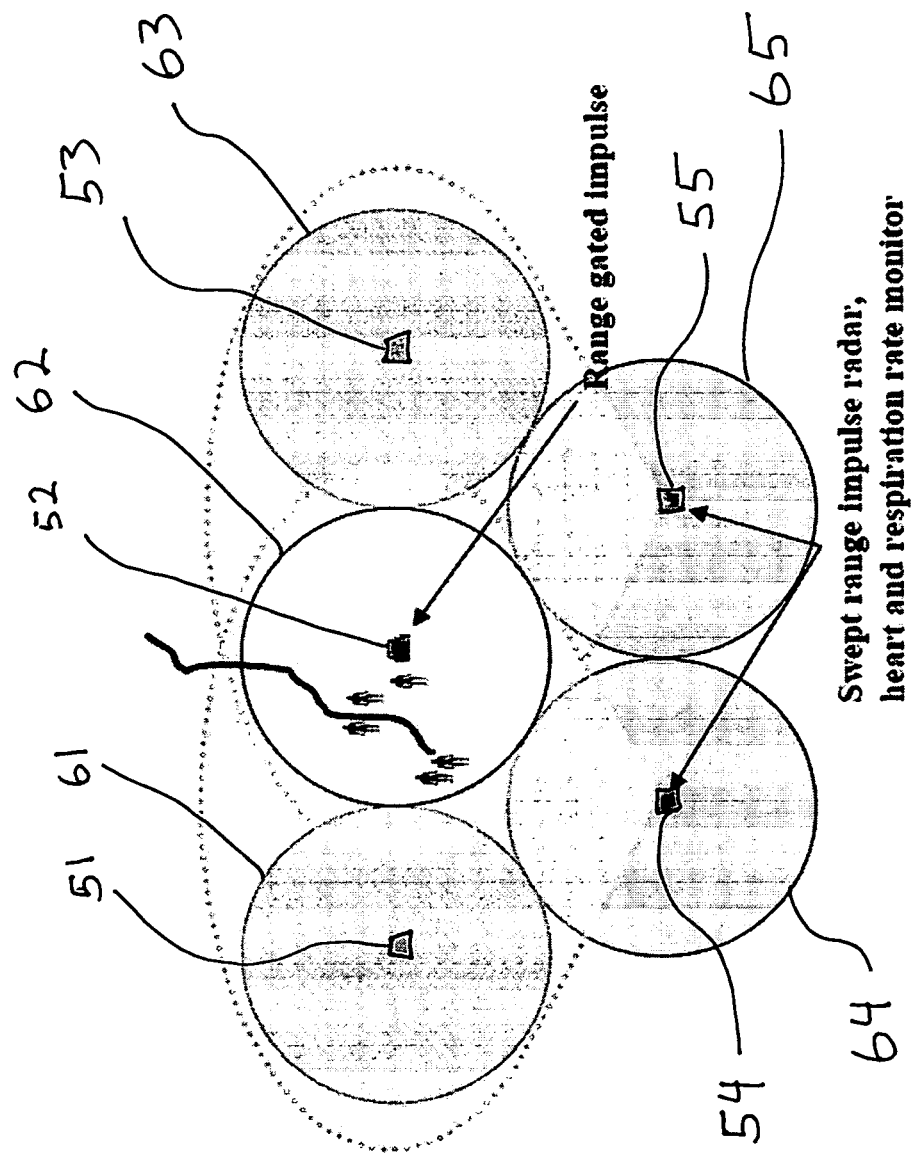
FIG. 4 illustrates the use a discrimination sensor that combines 3 individual sensors for detection, tracking, and heartbeat and respiration rate (hrr) monitoring.

A second approach involves the combination of three specialized radar sensors into a single package to for detecting, tracking, and discrimination. In this embodiment, radar sensors have been specifically designed to perform functions such as intrusion detection, tracking, and heart and respiration rate (HRR) detection. Combining these sensors and using cooperative networking techniques offers a highly accurate discrimination and tracking system. FIG. 4 shows an exemplary implementation of a discrimination sensor that combines the three individual sensors for detection, tracking, and heartbeat and respiration rate (HRR) monitoring. In the figure, each sensor unit (51-55) includes a motion sensor that sets up a motion measuring perimeter (61-65) respectively. The motion sensor comprises the fixed range gate UWB radar sensors discussed herein. Each sensor unit (51-55) also includes a dual range gate UWB radar sensor and a UWB heart and respiration rate monitor. By analyzing timing and signal levels, the location of an intruder within the measuring perimeter can be determined. One method of discrimination enhancement is net-centric or cooperative discrimination. This concept leverages the fact that the nodes are designed to be deployed in a network configuration. This has the potential to enable discrimination capabilities well beyond those of any given node in the network. A network detection capable radar sensor offers discrimination through cooperative communication. The nodes in the network are at known locations, therefore a basic path of the intruder passing though the network can be found by monitoring nodes detected and the detection time. This information can provide intrusion path, time of detection, and intruder source and destination.

A signal processing methods may be applied to improve signal collection and analysis. Such methods include Pseudo Wigner Distribution, Wavelet Transform, Extinction Pulse, Bispectral Analysis and Kernel Analysis.

Further discrimination and detection abilities could be gained by fusion or augmenting other types of sensors with the existing radar sensor package. For example, a sensitive magnetometer could be added to detect the presence of metallic objects on the intruder or to discriminate between people and animals based on presence or lack of clothing. Another approach uses a microphone or vibration sensor to pick up noise generated by the target and vibrations emitted by it while walking thought the detection region. A low power camera might also be employed to take an image of the intrusion and perform image recognition algorithms on the data.

Specialized sensors with accurately synchronized RF pulse transmissions can form a large, electronically steerable antenna array. Potential targets could be imaged as they passed though the network.

Thus, a low power network of the present sensors will detect motion, track the motion, and reliably determine if the dominant moving object was or was not a person. The key to this approach is the combination of several devices. The first is a low power motion sensor that uses micro impulse radar and is capable of continuous and reliable operation for months at a time with a small battery. The second is a dual radar motion tracking system. The third is a heartbeat and respiration rate (HRR) radar device. The combination of these three devices into one sensor package, when implemented in a network configuration, offers a unique solution to address this problem.

As discussed above, the CDS sensor consists of a number of micro-impulse radar sensors combined in a single package. One sensor is an omni directional bubble sensor. This sensor will be capable of establishing a set diameter radar "bubble" around itself. If this "bubble" is broken by a quasi-reflective radar target (such as a person) it is capable of detecting and indicating that. In addition a directional "range gated" radar unit will be included in the package. This sensor will be a directional sensor that has a field of view of approximately 120°. This sensor will be able to determine the range to a target in its field of view. In addition, data from this sensor may be able to be integrated over a long period of time to find the target's heart and respiratory rates. If that is not possible a third sensor will be used in the package. This sensor is specifically designed to determine the heart rate of a target at a set distance. The "range gated" sensor would be used to find the distance to the target and then this sensor would be set to search for a heart or respiratory rate at that distance.

This unique combination of existing sensors is intended to be used as part of a network to form an advance perimeter security system. The omni directional radar sensors would be used to establish radar "bubbles" around each sensor package, or networked sensor "node". These nodes would have their directional "range gated" radar sensors aimed in a way so their detection regions covered the two sensor nodes opposite them. This would allow them to track targets in the sensor bubbles across from them.

Embodiments of an UWB detection and tracking system having sensors and network concepts usable in the present invention are described in U.S. patent application Ser. No. 10/950,209, incorporated herein by reference. The application provides a system for detecting and tracking an individual or animal comprises producing a first return radar signal from the individual or animal with a first low power ultra wideband radar. Producing a second return radar signal from the individual or animal with a second low power ultra wideband radar. Maintaining the first low power micro-power radar a fixed distance from the second low power ultra wideband radar.

Embodiments of networks utilizing position estimation of transceivers in communication are provided in U.S. patent application Ser. No. 10/834,706 incorporated herein by reference. This application includes sensors and network configurations usable in the present invention. The application describes a system and method using wireless communication interfaces coupled with statistical processing of time-of-flight data to locate by position estimation unknown wireless receivers. Such an invention can be applied in sensor network applications, such as environmental monitoring of water in the soil or chemicals in the air where the position of the network nodes is deemed critical. Moreover, the embodiments can be arranged to operate in areas where a Global Positioning System (GPS) is not available, such as inside buildings, caves, and tunnels.

Accordingly, embodiments of the invention include methods for monitoring an area of interest, including the steps of placing a plurality of low power ultra wideband (UWB) radar motion sensors in an area of interest; transmitting an UWB radar signal in the area and receiving the signal by at least one motion sensor of the motion sensors to produce a received signal; analyzing the received signal to determine whether a movement has occurred within the area and producing an alarm signal if a motion has occurred within the area; communicating the alarm signal to a wireless ad hoc network to produce a forwarded alarm signal; and transmitting the forwarded alarm signal to a destination. Each sensor of the low power UWB radar motion sensors is a plurality of operatively connected electronics modules including a central processing module, global positioning module, transmitter and receiver communications module, power and control module, and radar detector sensor module. Each sensor can alternately be an UWB transceiver. The UWB signal can be transmitted continuously or periodically. The step of communicating the alarm signal to a wireless ad hoc network can includes transmitting the alarm signal to a mother-node. The wireless ad hoc network includes a plurality of nodes which can be UWB transceiver nodes. Further, the step of transmitting the forwarded alarm signal to a destination includes communicating the forwarded alarm signal to a satellite to produce a satellite signal, and then the satellite communicates the satellite signal to a destination. The alarm signal can be transmitted directly to an ad hoc node of the wireless ad hoc network. (For purposes of this application, including the claims, all teachings wherein a signal is communicated or transmitted or the like includes the teaching that only a portion of the signal is communicated or transmitted.) Each node of the network can be attached to a different sensor. The transceiver can comprise an omni-directional loop antenna. The sensor can comprise a range gated radar sensor, a dual range gate sensor or a multiple range gate sensor. The method can also comprise tracking the movement of the cause of an alarm and detecting the heart and/or respiration rate of the cause of the alarm. Other embodiments of the invention teach apparatuses for carrying out the above described methods.

REFERENCES

Rothwell, E. J., Nyquist, D. P, Chen, K M, Drachman, B., (1985) *Radar Target Discrimination Using the Extinction-Pulse Technique*, IEEE Transactions on Antennas and Propagation, Vol. AP-33. No. 9, September.

Chen, K. M., Nyquist, D. P., Rothwell, E. J., Webb, L. L, Drachman, B., (1986) *Radar Targe Discrimination by Convolution of Radar Return with Extinction-Pulses and Single-ModeExtraction Signals*, IEEE Transactions on Antennas and Propagation, Vol. AP-34, No. 7.

Rothwell, E J., Chen, K M., Nyquist, D. P., Gharsallah, N., Drachman, B., (1986) *Frequency Domain E-Pulse Synthesis and Target Discrimination*, IEEE Transactions on Antennas and Propagation, Vol. 34, 896-904, July 1986.

Ross, J. E., Rothwell, E. J., Nyquist, D. P., Chen, K. M., (1990) *Multiple Target Discrimination Using E-Pulse Techniques*, Antennas and Propagation Society International Symposium, 1990 AP-S, 'Merging Technologies for the 90's,' Digest 7-11, VOL. 3, 1342-1345.

Abrahamasson, S., Brunsmark, B., Baunaurd, G. C., and Stifors, H. C., (1991), *Target Identification By Means of Impulse Radar*, Automatic Object Recognition SPIE Vol. 1471. Jouny, I., (1992) *Wavelet decomposition of UWB radar signals*, Antennas and Propagation Society International Symposium, held in conjunction with: URSI Radio Science Meeting and Nuclear EMP Meeting, IEEE, 18-25 July. Jouny, I., (1992) *Target description using wavelet transform*, Acoustics, Speech, and Signal Processing, ICASSP-92, 1992 IEEE International Conference on, Vol. 4, 289-292.

Marmarelis, V. Z., Sheby, D., Kisenwether, E. C., Erdley, T. A., (1992) *Target material characterization using high-order signal processing of ultra-wideband radar data*, Telesystems Conference, NTC-92, National, 19-20 May, January 17-January 24.

Chambers, C., Cloude, S. R., Smith, P. D., Milne, A., Trafford, K, Parkes, D. M., (1993) *Wavelet processing of ultra wideband radar signals*, Antenna and Propagation Problems of Ultrawideband Radar, IEEE Colloquium.

Ilavarasan, P., Ross, J. E., Rothwell, E. J., Chen K. M., Nyquist, D. P., (1993) *Performance of an Automated Radar Target Discrimination Scheme Using E Pulses and S Pulses*, IEEE Transactions on Antennas and Propagation, Vol. 41, No. 5.

Skinner, Jeffrey B., Donohoe, Patrick J., and Ingels, Franklin, M., (1993), *Simulation of Target Responses to High Frequency Ultra Wideband Radar Signals Using the Physical Optics Impulse Response*, Proceedings of the IEEE, 0094-2898.

Jouny, L; Kanapathipillai, M. (1994) *Neural network adaptive wavelet classification of radar targets*, Geoscience and Remote Sensing Symposium, IGARSS '94. 'Surface and Atmospheric Remote Sensing: Technologies, Data Analysis and Interpretation', International, Volume: 4, 8-12 August, Vol. 4, 1889-1891.

Rothwell, E. J., Chen, K. M., Nyquist, D. P., Ross, J. E., Bebermeyer, R., (1994) *A radar target discrimination scheme using the discrete wavelet transform for reduced data storage* Antennas and Propagation, IEEE Transactions, Vol. 42 Issue 7, 1033-1037.

Rothwell, E. J., Chen, K. M., Nyquist, D. P., Ilavarasan, P., Ross, J. E., Bebermeyer, R., Li, Q., (1994) *A General E-pulse Scheme Arising from the Dual Early-Time/Late-Time Behavior of Radar Scatterers*, IEEE Transactions on Antennas and Propagation, Vol. 42, No. 9.

Chen, K. M., Rothwell, E. J., Nyquist, D. P., Bebermeyer, R., Li, Q., Tsai, C. Y., Norman, A., (1995) *Ultra-wideband/short-pulse radar for target identification and detection-laboratory study*, Radar Conference, Record of the IEEE 1995 International, 8-11 May 1995, 450-455.

Fargues, M. P., Brooks, W. A., (1995) *Comparative study of time-frequency and time-scale transforms for ultra-wideband radar transient signal detection*, Radar, Sonar and Navigation, IEE Proceedings, Vol. 142, Issue: 5, October, 236-242.

Gaunaurd, G. C., Strifors, H. C., (1996) *Signal analysis by means of time-frequency (Wignertype) distributions-applications to sonar and radar echoes*, SPE Proceedings, Vol. 84, Issue 9, 1231-1248.

Ilavaransan, L. P., Ross, J. E., Rothwell, E. J., Chen, K. M., Nyquist, D. P., (1998) *Radar Target Identification Using a Combined Early-Time/Late-Time E-Pulse Technique Q*, IEEE Transactions on Antennas and Propagation, Vol. 46. No. 9.

LoVetri, J., Primak, S., van Leersum, B. J. A. M., Zwamborn, A. P. M., (1998) *Feasibility study into the identification of landmines using UWB radar: an analysis using synthesized data*, Ultra-Wideband Short-Pulse Electromagnetics 4, 1998, 14-19 Jun. 1998, 425-432.

Primak, Serguei L., LoVetri, Joe, Damjanschitz, Zsuzsanna, and Kashyap, Satish, (1999) *Auto-Regressive Filter-Based E-Pulse Discriminating Scheme*, IEEE Transactions on Antennas and Propagation, Vol. 47, No. 1.

Mooney, Joe E., Ding, Zhi, Riggs, Lloyd, S., (2000) *Performance Analysis of an Automated E-Pulse Target Discrimination Scheme*, IEEE Transactions on Antennas and Propagation, Vol. 48, No. 3.

Strifors, Hans C., Friedmann, Anders, Abrahamson, Steffan, Gaunaurd, Guillermo C., (2000) *Comparison of the relative merits for target recognition by ultrawideband radar based on emitted impulse or step frequency*, Proceedings of the IEEE, Vol. 4050, 2-11, Automatic Target Recognition.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A method for monitoring an area of interest, comprising:
placing a plurality of low power ultra wideband (UWB) radar motion sensors in an area of interest;
transmitting an UWB radar signal in said area and receiving said signal with at least one motion sensor of said motion sensors to produce a received signal;
analyzing said received signal to determine whether a movement has occurred within said area and producing an alarm signal if a motion has occurred within said area;
communicating said alarm signal to a wireless ad hoc network to produce a forwarded alarm signal, wherein said wireless ad hoc network comprises a mother node and a plurality of nodes, wherein the step of communicating said alarm signal to a wireless ad hoc network includes transmitting said alarm signal by UWB radar to said mother-node; and
transmitting said forwarded alarm signal to a destination.

2. The method of claim 1, wherein each sensor of said low power UWB radar motion sensors comprises a plurality of operatively connected electronics modules comprising a central processing module, a global positioning module, a transmitter and receiver communications module, a power and control module, and a radar detector sensor module.

3. The method of claim 1, wherein each sensor comprises an UWB transceiver.

4. The method of claim 1, wherein the step of transmitting comprises continuously transmitting an UWB signal.

5. The method of claim 1, wherein the step of transmitting comprises periodically transmitting an UWB signal.

6. The method of claim 1, wherein said wireless ad hoc network comprises a plurality of UWB transceiver nodes.

7. The method of claim 1, wherein the step of transmitting said forwarded alarm signal to a destination includes communicating said forwarded alarm signal to a satellite to produce a satellite signal, wherein said satellite communicates said satellite signal to a destination.

8. The method of claim 1, wherein the step of communicating said alarm signal to a wireless ad hoc network includes transmitting said alarm signal directly to an ad hoc node of said wireless ad hoc network.

9. The method of claim 1, wherein said wireless ad hoc network comprises a plurality of UWB transceiver nodes, wherein each node of said network is attached to a different sensor of said sensors.

10. The method of claim 1, wherein said transceiver comprises an omni-directional loop antenna.

11. The method of claim 1, wherein said sensor comprises a range gated radar sensor.

12. The method of claim 1, wherein said sensor comprises a dual range gate sensor.

13. The method of claim 1, wherein said sensor comprises a multiple range gate sensor.

14. The method of claim 1, further comprising tracking the movement of the cause of an alarm.

15. The method of claim 14, further comprising detecting the heart and/or respiration rate of the cause of said alarm.

16. An apparatus for monitoring an area of interest, comprising:

a plurality of low power ultra wideband (UWB) radar motion sensors for placement in an area of interest;

means for transmitting an UWB radar signal in said area wherein at least a portion of said signal can be received with at least one motion sensor of said motion sensors to produce a received signal;

means for analyzing said received signal to determine whether a movement has occurred within said area and producing an alarm signal if a motion has occurred within said area;

means for communicating at least a portion of said alarm signal to a wireless ad hoc network to produce a forwarded alarm signal, wherein said wireless ad hoc network comprises a mother node and a plurality of nodes, wherein said means for communicating at least a portion of said alarm signal to a wireless ad hoc network includes means for transmitting said alarm signal by UWB radar to said mother-node; and means for transmitting said forwarded alarm signal to a destination.

17. The apparatus of claim 16, wherein each sensor of said low power UWB radar motion sensors comprises a plurality of operatively connected electronics modules comprising a central processing module, a global positioning module, a transmitter and receiver communications module, a power and control module and a radar detector sensor module.

18. The apparatus of claim 16, wherein each sensor comprises an UWB transceiver.

19. The apparatus of claim 16, wherein said means for transmitting comprises means for continuously transmitting an UWB signal.

20. The apparatus of claim 16, wherein said means for transmitting comprises means for periodically transmitting an UWB signal.

21. The apparatus of claim 16, wherein said wireless ad hoc network comprises a plurality of UWB transceiver nodes.

22. The apparatus of claim 16, wherein said means for transmitting said forwarded alarm signal to a destination includes means for communicating said forwarded alarm signal to a satellite to produce a satellite signal, wherein said satellite communicates said satellite signal to a destination.

23. The apparatus of claim 16, wherein said wireless ad hoc network comprises a plurality of UWB transceiver nodes, wherein each node of said network is attached to a different sensor of said sensors.

24. The apparatus of claim 16, wherein said transceiver comprises an omni-directional loop antenna.

25. The apparatus of claim 16, wherein said sensor comprises a range gated radar sensor.

26. The apparatus of claim 16, wherein said sensor comprises a dual range gate sensor.

27. The apparatus of claim 16, wherein said sensor comprises a multiple range gate sensor.

28. The apparatus of claim 16, further comprising means for tracking the movement of the cause of an alarm.

29. The apparatus of claim 28, further comprising means for detecting the heart and/or respiration rate of the cause of said alarm.

* * * * *